(12) United States Patent
Berg et al.

(10) Patent No.: US 8,916,072 B2
(45) Date of Patent: Dec. 23, 2014

(54) GRADIENT-INDEX (GRIN) LENS FABRICATION EMPLOYING LASER PULSE WIDTH DURATION CONTROL, AND RELATED COMPONENTS, SYSTEMS, AND METHODS

(71) Applicants: David Matthew Berg, Rochester, NY (US); Jeffrey Dean Danley, Hickory, NC (US); Jeffery Alan DeMeritt, Painted Post, NY (US); Robert Stephen Wagner, Corning, NY (US); James Joseph Watkins, Corning, NY (US)

(72) Inventors: David Matthew Berg, Rochester, NY (US); Jeffrey Dean Danley, Hickory, NC (US); Jeffery Alan DeMeritt, Painted Post, NY (US); Robert Stephen Wagner, Corning, NY (US); James Joseph Watkins, Corning, NY (US)

(73) Assignee: Corning Cable Systems LLC, Hickory, NC (US)

( * ) Notice: Subject to any disclaimer, the term of this patent is extended or adjusted under 35 U.S.C. 154(b) by 297 days.

(21) Appl. No.: 13/665,363

(22) Filed: Oct. 31, 2012

(65) Prior Publication Data

US 2014/0116995 A1    May 1, 2014

(51) Int. Cl.
  *B23K 26/36*    (2014.01)
(52) U.S. Cl.
  USPC ................ 264/1.37; 219/121.68; 219/121.69

(58) Field of Classification Search
  CPC ........ B23K 26/08; B23K 26/36; B23K 26/38; B23K 26/40; B23K 26/0039; B23K 26/4075
  USPC .......... 264/1.37; 219/121.67, 121.68, 121.69, 219/121.72
  See application file for complete search history.

(56) References Cited

U.S. PATENT DOCUMENTS

| | | | |
|---|---|---|---|
| 8,704,987 B2 * | 4/2014 | Harrold et al. ................. | 349/129 |
| 2009/0202202 A1 | 8/2009 | Lee et al. ......................... | 385/33 |
| 2012/0189252 A1 * | 7/2012 | Bhagavatula et al. .......... | 385/79 |

FOREIGN PATENT DOCUMENTS

| | | | | |
|---|---|---|---|---|
| CA | 2426848 C | 8/2009 | ........... | B23K 26/073 |
| JP | g02 b | 9/2003 | ............... | G02B 6/00 |

* cited by examiner

*Primary Examiner* — Samuel M Heinrich

(57) ABSTRACT

Gradient-index (GRIN) lens fabrication employing laser pulse width duration control, and related components, systems, and methods are disclosed. GRIN lenses can be fabricated from GRIN rods by controlling the pulse width emission duration of a laser beam emitted by a laser to laser cut the GRIN rod, as the GRIN rod is disposed in rotational relation to the laser beam. Controlling laser pulse width emission duration can prevent or reduce heat accumulation in the GRIN rod during GRIN lens fabrication. It is desired that the end faces of GRIN lenses are planar to facilitate light collimation, easy bonding or fusing of the GRIN lens to optical fibers to reduce optical losses, polishing to avoid spherical aberrations, and/or cleaning the end faces when disposed in a fiber optic connector, as non-limiting examples.

35 Claims, 12 Drawing Sheets

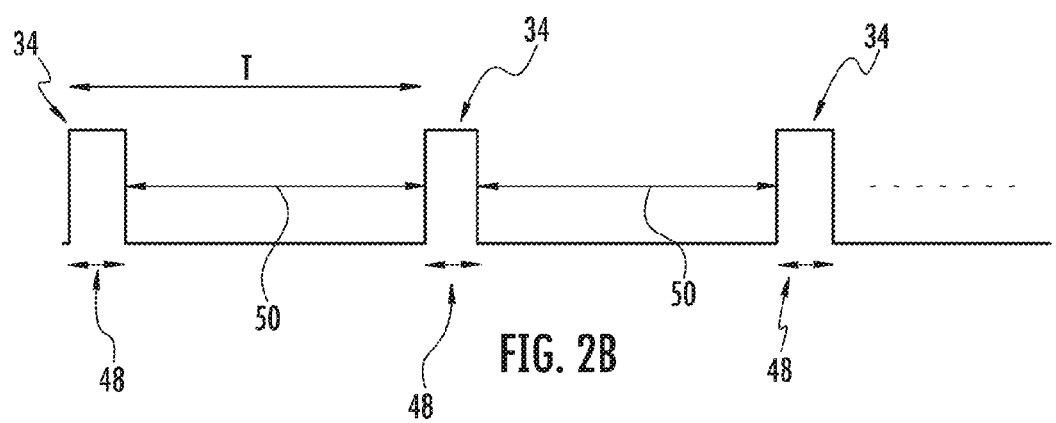

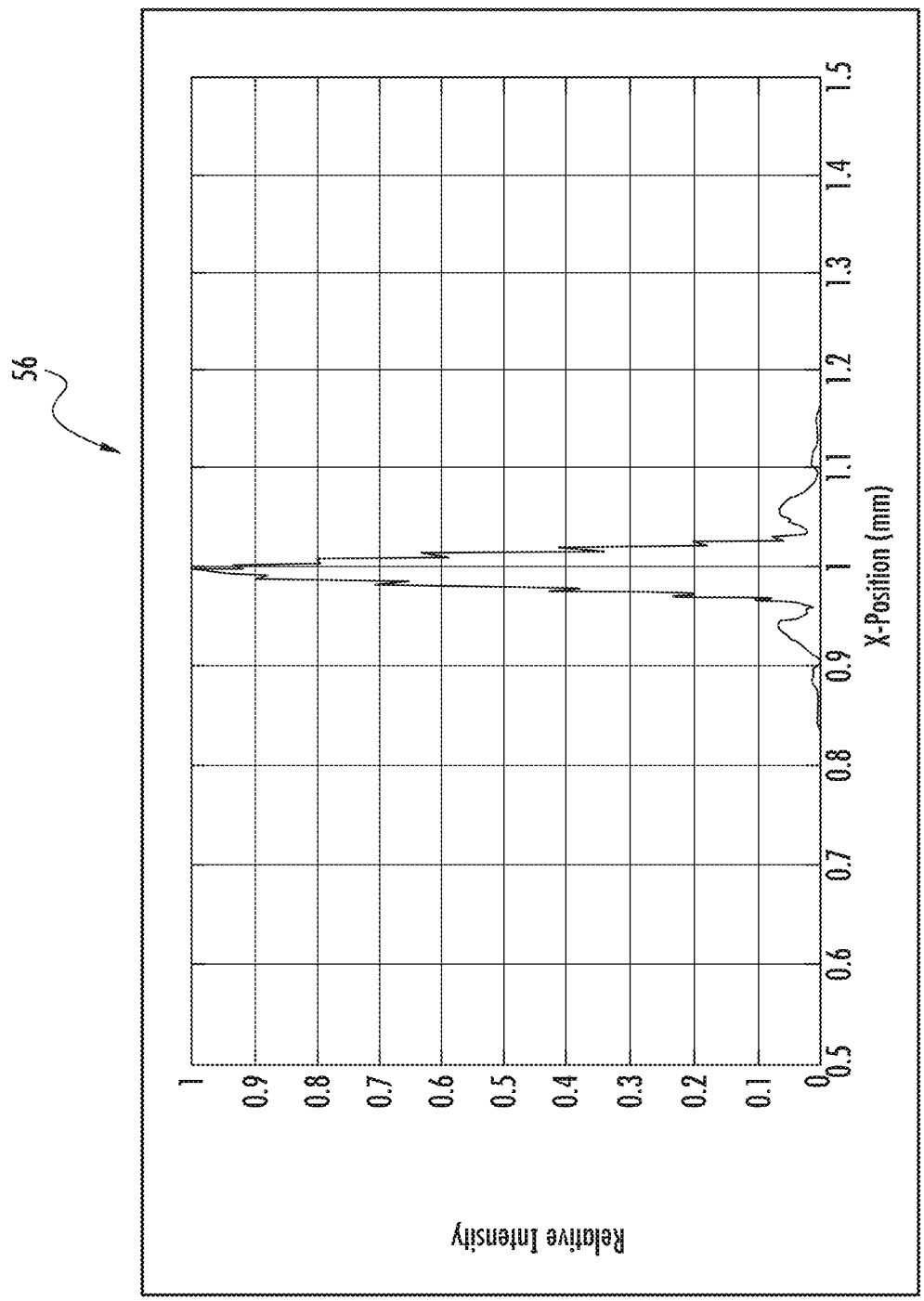

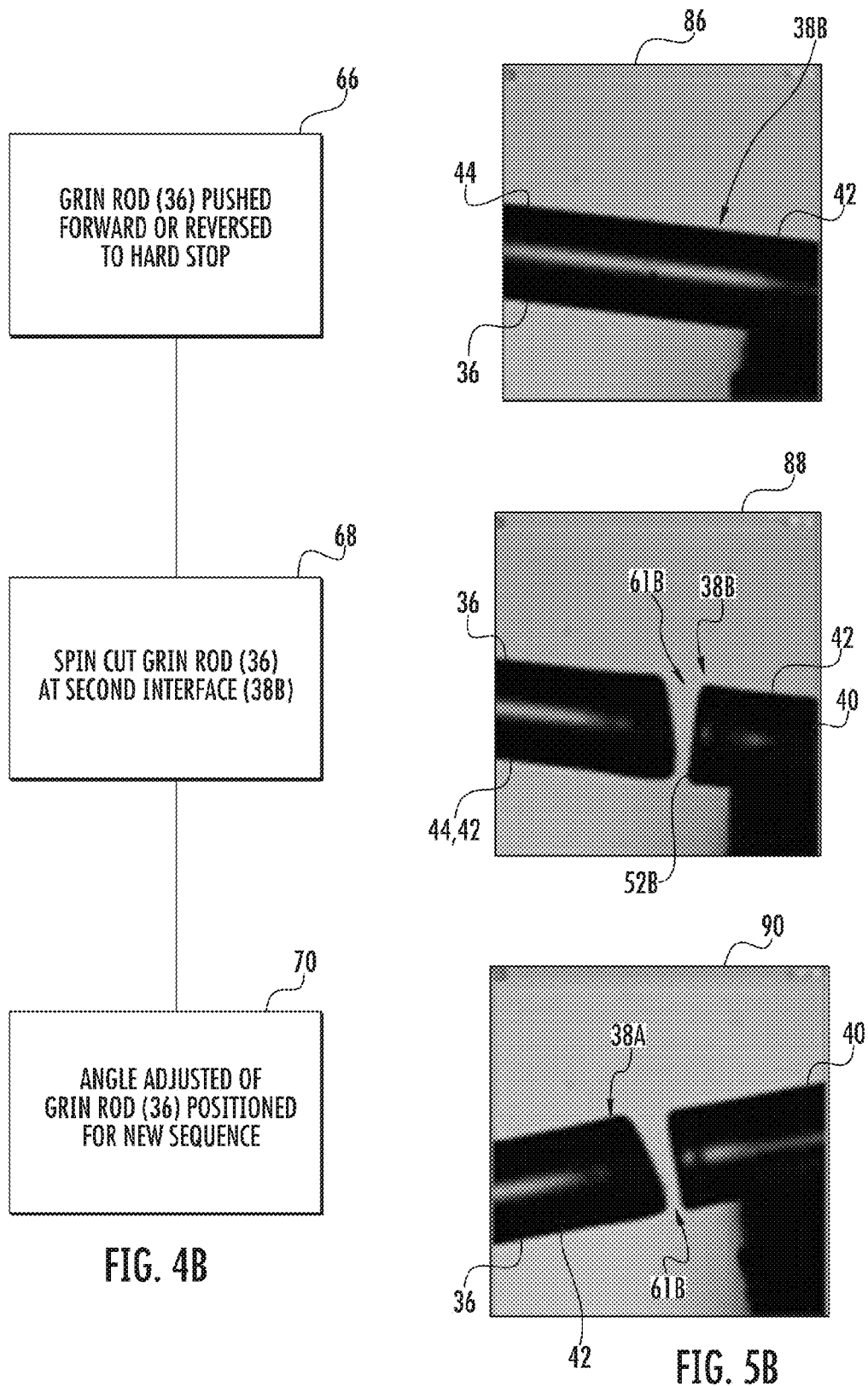

GRADIENT-INDEX (GRIN) LENS FABRICATION EMPLOYING LASER PULSE WIDTH DURATION CONTROL, AND RELATED COMPONENTS, SYSTEMS, AND METHODS

BACKGROUND

1. Field of the Disclosure

The technology of the disclosure relates to fabricating gradient-index (GRIN) lenses. The GRIN lenses may be employed in fiber optic connectors for facilitating high communication bandwidth optical connections.

2. Technical Background

The increasing trend towards high performance computing (HPC) is driving the need for increased bandwidth of data communications between electrical data processing units. For example, communication rates between electrical data processing units may require data transfer rates of Gigabits per second (Gps) or even tens (10s) of Gps. In this regard, optical fibers are increasingly being used in lieu of copper wires as a communication medium between these electrical data processing units for high data rate communications. One or more optical fibers are packaged in a cable to provide a fiber optic cable for communicatively connecting electrical data processing units. Optical fiber is capable of transmitting an extremely large amount of bandwidth compared to a copper conductor with less loss and noise. An optical fiber is also lighter and smaller compared to a copper conductor having the same bandwidth capacity.

In this regard, fiber optic connectors are provided to facilitate optical connections with optical fibers for the transfer of light. For example, optical fibers can be optically connected to another optical device, such as a light-emitting diode (LED), laser diode, or opto-electronic device for light transfer. As another example, optical fibers can be optically connected to other optical fibers through mated fiber optic connectors. In any of these cases, it is important that the end face of an optically connected optical fiber be precisely aligned with the optical device or other optical fiber to avoid or reduce coupling loss. For example, the optical fiber is disposed through a ferrule that precisely locates the optical fiber with relation to the fiber optic connector housing.

It is common to provide flat end-faced multi-fiber ferrules to more easily facilitate multiple optical fiber connections between the fiber optic connector supporting the ferrule and other fiber optic connectors or other optical devices. In this regard, it is important that fiber optic connectors be designed to allow the end faces of the optical fibers disposed in the ferrule to be placed into contact or closely spaced with an optical device or other optical fiber for light transfer. If an air gap is disposed between the optical fiber and the optical device or other optical fiber, the end of the optical fiber is cleaved (e.g., laser-cleaved) and polished into a curved form to allow it to act as a lens. Spherical aberrations can occur when the end face of the optical fiber is cleaved and polished into a curved form, thereby introducing optical losses.

Gradient-index (GRIN) lenses offer an alternative to providing polished curvatures onto ends of optical fibers to form optical lenses. GRIN lenses focus light through a precisely controlled radial variation of the lens material's index of refraction from the optical axis to the edge of the lens. The internal structure of this index gradient can dramatically reduce the need for tightly controlled surface curvatures. This allows GRIN lenses to be provided with planar or substantially planar end surfaces or end faces to collimate light emitted from the optical fibers or to focus an incident beam into optical fibers.

A GRIN lens can be fabricated by cutting a portion of a GRIN rod to a desired length. For example, a mechanical cleaving process may be employed to cut a GRIN rod to the desired length as an initial step to fabricating a GRIN lens. As another example, a laser may be employed to cut a GRIN rod to the desired length to fabricate a GRIN lens. The process of cutting a GRIN rod to form a GRIN lens also creates end faces in the GRIN lens. The end faces of GRIN lenses can also be polished to be planar or substantially planar to a mating face. Mechanical polishing may be employed to polish the end faces of GRIN lenses. Mechanical polishing may be desired over laser polishing. Laser polishing may require exposing the GRIN lenses to laser energy for sufficient periods of time that may damage or crack the GRIN lenses. However, mechanical polishing processes can be labor-intensive. Mechanical polishing equipment can also be expensive and not have the desired manufacturing throughput. At various stages of polishing, the ferrules and respective optical fibers may also have to be inspected. Also, human involvement in mechanical polishing can lead to optical surface variations in mechanical polishing processes.

SUMMARY OF THE DETAILED DESCRIPTION

Embodiments disclosed herein include gradient-index (GRIN) lens fabrication employing laser pulse width duration control, and related components, systems, and methods. GRIN lenses can be fabricated from GRIN rods by laser cutting and related processes. The fabricated GRIN lenses may be employed in a fiber optic connector and/or other fiber optic components for facilitating optical connections, including for high bandwidth communications rates.

In this regard, GRIN lenses can be fabricated from GRIN rods by controlling the pulse width emission duration of a laser beam emitted by a laser to laser cut the GRIN rod, as the GRIN rod is disposed in rotational relation to the laser beam. Controlling laser pulse width emission duration to fabricate GRIN lenses can prevent or reduce heat accumulation in the GRIN rod during GRIN lens fabrication. Heat accumulation can lead to rounding of end face optical surfaces fabricated in a GRIN lens. It is desired that the end faces of GRIN lenses are planar. As non-limiting examples, providing planar end faces in GRIN lenses can facilitate efficient light collimation, easy bonding or fusing of the GRIN lens to optical fibers to reduce optical losses through air gaps, polishing to avoid or reduce spherical aberrations, and/or easy cleaning of end faces of the GRIN lenses when disposed in a fiber optic connector. Controlling laser pulse width emission duration to fabricate GRIN lenses can also allow laser polishing of end faces of GRIN lenses as opposed to mechanical polishing.

In this regard in one embodiment, a method of fabricating a gradient-index (GRIN) lens from a GRIN rod is provided. The method comprises positioning an interface of a GRIN rod in a laser beam path of a laser configured to emit a laser beam in the laser beam path. The method also comprises providing a rotational relationship between the GRIN rod and the laser beam path. The method also comprises controlling the laser to direct a laser beam in pulse width durations in the laser beam path incident to the interface of the GRIN rod, to spin cut a planar or substantially planar optical surface end face in the GRIN rod at the interface.

In another embodiment, an apparatus for fabrication of a gradient-index (GRIN) lens from a GRIN rod is provided. The apparatus comprises a laser configured to emit a laser beam in pulse width durations in a laser beam path. The apparatus also comprises a fixture configured to support a GRIN rod in the laser beam path of the laser, wherein the fixture is further configured to support the GRIN rod in rotational relationship with laser beam path. The apparatus also comprises a controller configured to direct the laser to emit the laser beam in pulse width durations in the laser beam path incident to an interface of the GRIN rod, to spin cut a planar or substantially planar optical surface end face in the GRIN rod at the interface.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 2B is a schematic diagram of controlling laser pulse width duration of the laser of the laser processing apparatus in FIG. 2A during fabrication of a GRIN lens;

FIGS. 3B and 3C are graphs of the exemplary Gaussian line normalized energy distributions of the directed laser beam emitted by the laser in the laser processing apparatus of FIG. 2A in the X and Y directions, respectively;

FIGS. 4A and 4B are flowchart diagrams of an exemplary process of fabrication of a GRIN lens from a GRIN rod employing the laser processing apparatus of FIG. 2A;

FIGS. 5A and 5B are exemplary partial diagrams of the GRIN rod and fabricated GRIN lens as the GRIN lens is fabricated in the exemplary steps in the exemplary process in FIGS. 4A and 4B;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include gradient-index (GRIN) lens fabrication employing laser pulse width duration control, and related components, systems, and methods. GRIN lenses can be fabricated from GRIN rods by laser cutting and related processes. The fabricated GRIN lenses may be employed in fiber optic connector and/or other fiber optic components for facilitating optical connections, including for high bandwidth communications rates.

In this regard, GRIN lenses can be fabricated from GRIN rods by controlling the pulse width emission duration of a laser beam emitted by a laser to laser cut the GRIN rod, as the GRIN rod is disposed in rotational relation to the laser beam. Controlling laser pulse width emission duration to fabricate GRIN lenses can prevent or reduce heat accumulation in the GRIN rod during GRIN lens fabrication. Heat accumulation can lead to rounding of end face optical surfaces fabricated in a GRIN lens. It is desired that the end faces of GRIN lenses are planar or substantially planar. As non-limiting examples, providing planar end faces in GRIN lenses can facilitate efficient light collimation, easy bonding or fusing of the GRIN lens to optical fibers to reduce optical losses through air gaps, polishing to avoid or reduce spherical aberrations, and/or easy cleaning of end faces of the GRIN lenses when disposed in a fiber optic connector. Controlling laser pulse width emission duration to fabricate GRIN lenses can also allow laser polishing of end faces of GRIN lenses as opposed to mechanical polishing.

Figure 1A:
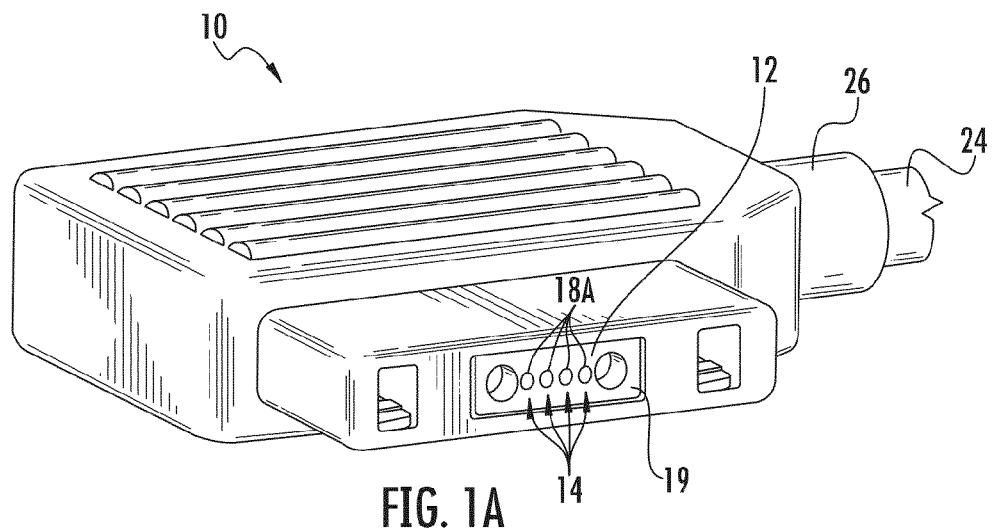
FIG. 1A is a perspective view of an exemplary fiber optic connector employing a gradient-index (GRIN) lens holder supporting GRIN lenses.
Figure 1B:
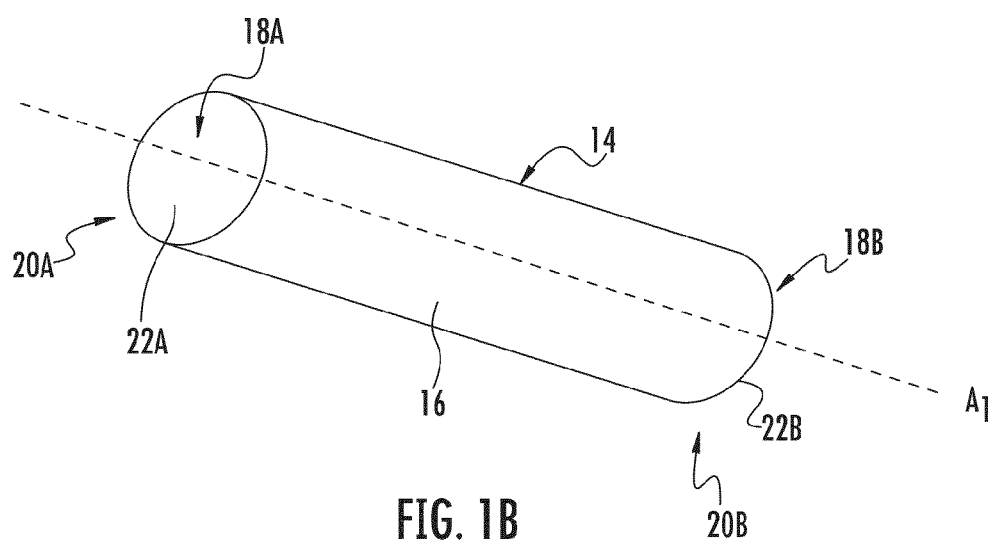
FIG. 1B is a perspective view of an exemplary GRIN lens.

As discussed above, the fabricated GRIN lenses may be employed in a fiber optic connector and/or other fiber optic components for facilitating optical connections. In this regard, FIG. 1A is a perspective view of an exemplary fiber optic connector 10 employing a GRIN lens holder 12 supporting GRIN lenses 14. As illustrated in FIG. 1B, each GRIN lens 14 is fabricated from a glass or GRIN rod 16. End faces 18A, 18B are formed on a first end 20A and a second end 20B of the GRIN lens 14, respectively. The end faces 18A, 18B of the GRIN lens 14 form planar or substantially planar optical surfaces 22A, 22B on the first end 20A and the second end 20B of the GRIN lens 14, respectively. In one embodiment, light is focused through a precisely controlled radial variation of the GRIN lens 14 material's index of refraction from the optical axis $A_1$ of the GRIN lens 14 to an end face 18A or 18B of the GRIN lens 14. The internal structure of the index gradient of the GRIN lenses 14 can dramatically reduce the need for tightly controlled surface curvatures at the end faces 18A, 18B. The planar or substantially planar end faces 18A, 18B of the GRIN lenses 14 also allow for easy cleaning of the optical surfaces 22A, 22B disposed therein.

As illustrated in FIG. 1A, the GRIN lenses 14 are disposed in the GRIN lens holder 12 of the fiber optic connector 10. The end faces 18A of the GRIN lenses 14 are exposed at a mating face 19 of the fiber optic connector 10 in this embodiment. An optical connection is made to the GRIN lenses 14 by optically connecting the end faces 18A of the GRIN lenses 14 to optical fibers in a mated receptacle or other optical component. The end faces 18B of the GRIN lenses 14 are also optically connected to end portions of optical fibers disposed in the fiber optic connector 10 (not shown) from a fiber optic cable 24 disposed through a cable conduit 26 of the fiber optic connector 10.

Figure 2A:
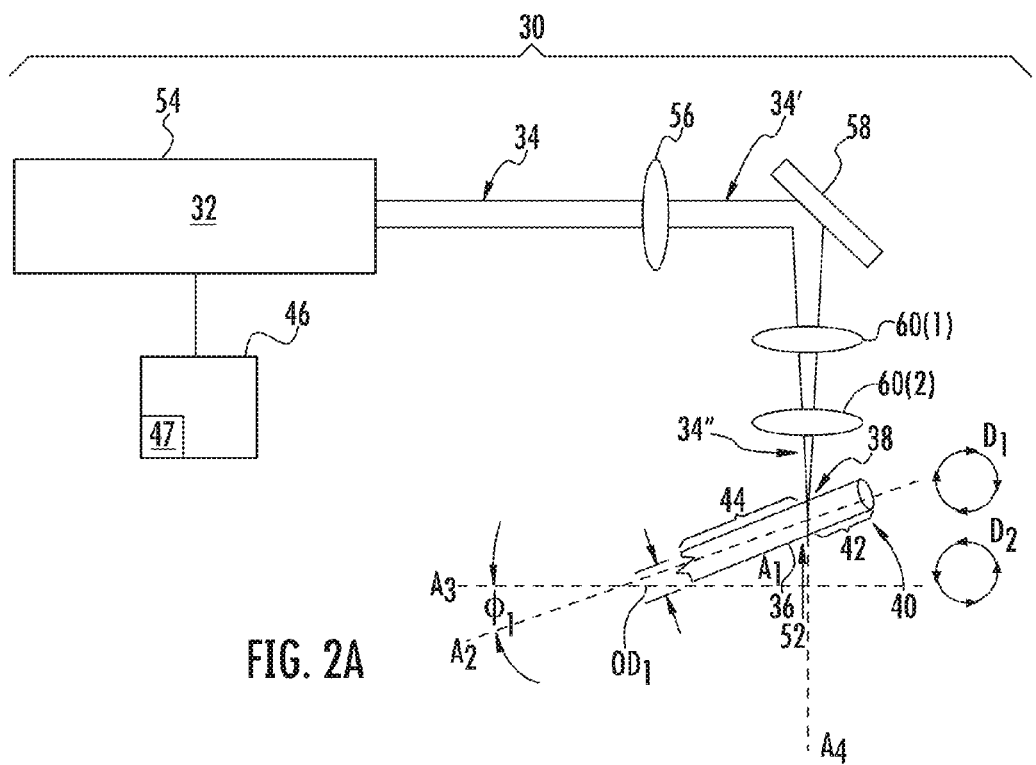
FIG. 2A is a side view of an exemplary laser processing apparatus including a laser configured to emit a laser beam under laser pulse width duration control to fabricate a GRIN lens from a GRIN rod.

A GRIN lens, including GRIN lenses 14 in the fiber optic connector 10 in FIG. 1A, can be fabricated by laser cutting a GRIN rod by a laser under laser pulse width duration control. Before discussing exemplary process details of fabricating a GRIN lens by a laser under laser pulse width duration control, an exemplary laser processing apparatus 30 (shown in FIG. 2A) configured to fabricate a GRIN lens by a laser under laser pulse width duration control is described. In this regard, FIG. 2A illustrates a laser processing apparatus 30 that is configured to fabricate a GRIN lens by a laser under laser pulse width duration control. The laser processing apparatus 30 includes a laser 32. The laser 32 is configured to emit a laser beam 34 towards a GRIN rod 36 to thermally cut the GRIN rod 36 at an interface 38 as the GRIN rod 36 is rotated. FIG. 2A illustrates a cross-section of the laser beam 34" in the X-direction, as shown in FIG. 3B described below. The laser energy of the laser beam 34 is spatially controlled with regard to the GRIN rod 36. The laser beam 34 thermally melts and/or ablates the GRIN rod 36 at the interface 38. A GRIN lens 40 is fabricated by an end portion 42 of the GRIN rod 36 being cut and severed from a main portion 44 of the GRIN rod 36 as a result of the thermal energy of the laser beam 34 melting and/or ablating the GRIN rod 36.

Melting involves transforming a solid phase of a material into a liquid or liquid phase. Ablation involves transforming a solid phase of a material into a gas or gaseous phase. Both melting and ablation can occur during thermal cutting. The GRIN rod 36 is manufactured from a material that is absorptive of enough laser energy (i.e., optical energy) from the laser beam 34 to thermally cut the GRIN rod 36 to fabricate the GRIN lens 40. For example, the GRIN rod 36 may be manufactured from silica (i.e., silicon dioxide), a silica composition, or ceramic glass, as non-limiting examples. For example, for a silica GRIN rod 36, the laser 32 may be provided as a carbon-dioxide ($CO_2$) laser configured to emit the laser beam 34 having laser energy at approximately 10,600 nanometers (nm). Silica is highly thermally absorptive of optical energy above approximately 3,000 nm. The laser 32 may emit the laser beam 34 with 100 Watts (W) of power, as another non-limiting example.

With continuing reference to FIG. 2A, the laser 32 is controlled by a controller 46 to emit the laser beam 34 under pulse width duration control. The pulse width duration of the laser beam 34 is controlled by control parameters provided to the controller 46. For example, the control parameters may be programmed and stored in memory 47 of the controller 46 through a user interface (not shown). The overall duration of the laser beam 34 emission is also controlled by control parameters programmed and stored in memory 47 of the controller 46 to provide the desired interaction time between laser energy and the GRIN rod 36 to cut the GRIN rod 36 at the interface 38.

FIG. 2B illustrates the laser beam 34 emitted by the laser 32 in FIG. 2A under pulse width duration control. As illustrated in FIG. 2B, the laser 32 is controlled to control the pulse width duration 48 of the laser beam 34 over a given period T as the GRIN rod 36 is rotated. For example, the GRIN rod 36 may be rotated at fifteen (15) revolutions per second. The laser beam 34 is emitted for the pulse width duration 48 during each period T in a periodic fashion to cut the GRIN rod 36 in FIG. 2A as the GRIN rod 36 is rotated. The pulse width durations 48 may be controlled to be between 350 μs to 450 μs, as a non-limiting example. The laser 32 is controlled to provide rest time 50 for the remainder of time in the period T after the emission of the laser beam 34 for the pulse width duration 48. The laser 32 is controlled to not emit the laser beam 34 during rest time 50. For example, as a non-limiting example, the rest times 50 may be approximately 4400 μs to 4800 μs in each period T. Thus in the example provided above, the pulse width durations 48 may be approximately eight percent (8%) to twelve percent (12%) of the laser beam emission periods T of the laser 32, to control the interaction time between the laser energy of the laser beam 34 and the GRIN rod 36.

Controlling the pulse width emission durations of the laser beam 34 to fabricate the GRIN lens 40 prevents or reduces heat accumulation in the GRIN rod 36 during the cutting of the GRIN rod 36. Heat accumulation can lead to rounding of end face optical surfaces fabricated in a GRIN lens. For example, the temperature of the laser energy of the laser beam 34 directed to the GRIN rod 36 may rise from room temperature to very high temperatures (e.g., 2700 degrees Celsius) generally in periods of hundreds of microseconds. The vaporization point of fused silica is approximately 2700 degrees Celsius. Thus, controlling the pulse width durations of the laser beam 34 is performed to avoid or reduce heat storage in the GRIN rod 36 to avoid rounding and to provide a planar or substantially planar end face 52 (referred to herein as "end face 52") at the interface 38 of the GRIN lens 40 during the processing of laser cutting the GRIN rod 36.

Figure 3A:
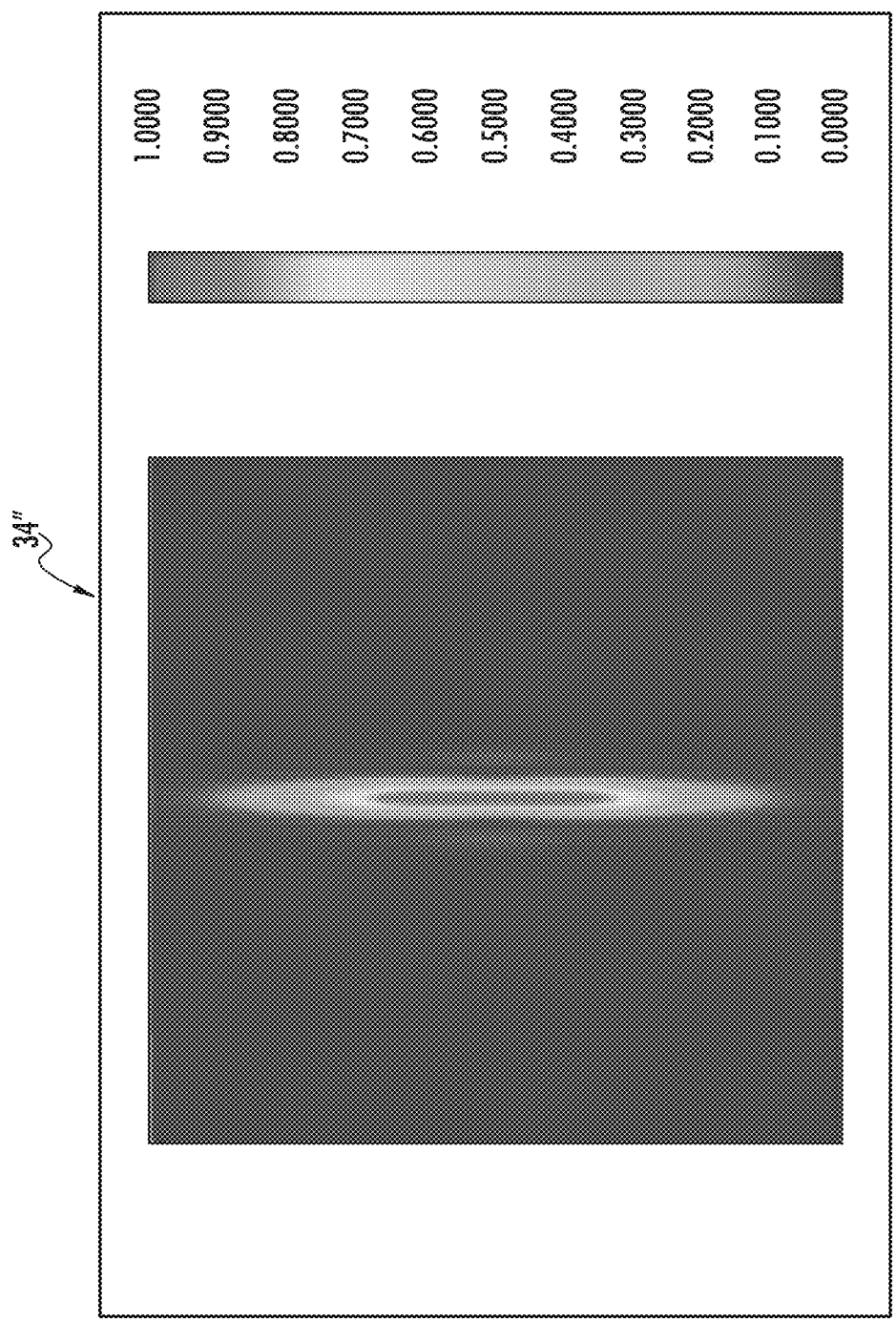
FIG. 3A is an exemplary Gaussian energy distribution of the directed laser beam emitted by the laser in the laser processing apparatus of FIG. 2A and directed to a GRIN rod to cut the GRIN rod to fabricate a GRIN lens.
Figure 3C:
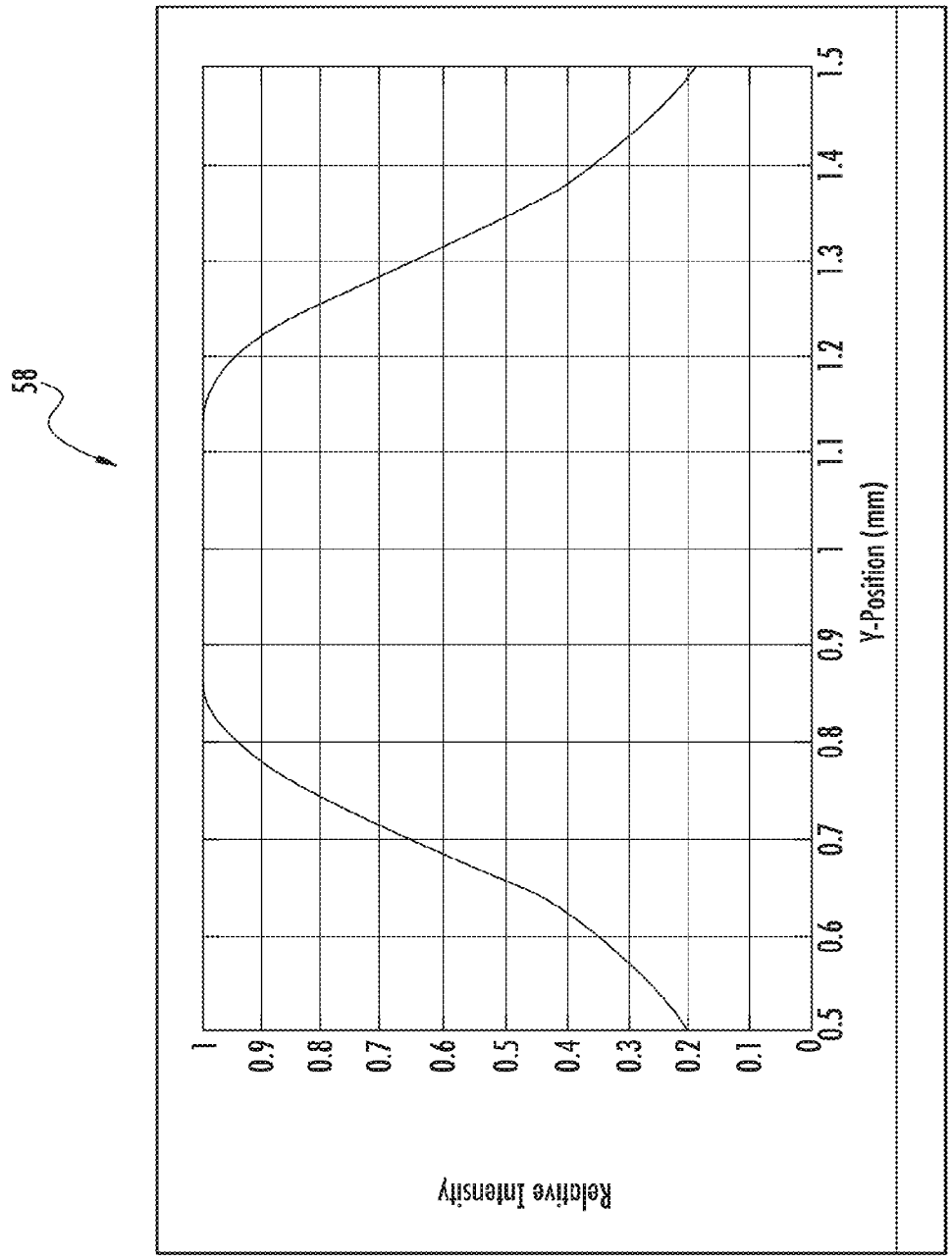

With continuing reference to FIG. 2A, the laser 32 is supported by a fixture 54 in the example of the laser processing apparatus 30. In this example, the laser 32 directs the laser beam 34 to at least one optional focusing lens 56 in the path of the laser beam 34. The focusing lens 56 may be made of a high-grade optical material, such as Germanium (Ge) or zinc selenide (ZnSe), as non-limiting examples. The focusing lens 56 focuses the received laser beam 34 into a smaller, focused laser Gaussian line beam 34' to concentrate the laser energy of the laser beam 34. The focusing lens 56 may be shaped to produce the same focused laser energy distribution in the cross section of the laser beam 34. The focusing lens 56 directs the laser line beam 34' to at least one mirror 58. The mirror 58 may be made of a highly reflective material for the laser beam 34' having the desired wavelength range, such as an aluminum material or a silicon carbide material, as non-limiting examples. The mirror(s) 58 steers or directs the focused laser beam 34' towards additional cylindrical lens(es) 60(1), 60(2) that produce a short linear Gaussian stationary energy distribution of the laser line beam 34" directed to the interface 38 of the GRIN rod 36 to fabricate the GRIN lens 40. FIG. 3A illustrates an example of a Gaussian energy distribution of the laser line beam 34", as a non-limiting example. FIGS. 3B and 3C are graphs 56, 58 of the Gaussian line normalized energy distributions of the directed laser beam 34" in the X and Y directions, respectively, directed to the interface 38 of the GRIN rod 36 to fabricate the GRIN lens 40.

With continuing reference to FIG. 2A, the GRIN rod 36 is positioned at an angle incident to the Gaussian energy distribution of the laser line beam 34". The GRIN rod 36 is positioned along its longitudinal axis $A_2$ at angle $\emptyset_1$ with regard to the axis $A_3$, which is orthogonal to the axis $A_4$ of the path of the laser line beam 34". For example, the angle $\emptyset_1$ may be seventeen degrees) (17° as a non-limiting example. The Gaussian energy distribution of the laser line beam 34" provides a planar or substantially planar end face 52 in the GRIN lens 40 when the GRIN rod 36 is positioned at angle $Ø_1$ incident to the path of the laser line beam 34". The GRIN rod 36 is positioned at angle $Ø_1$ incident to the path of the laser line beam 34", because the Gaussian energy distribution of the laser line beam 34" has a conical shape. The GRIN rod 36 is rotated about its center axis $A_2$, either in direction $D_1$ or $D_2$, at the desired speed as the laser beam 34" is directed towards the interface 38 of the GRIN rod 36. For example, the GRIN rod 36 may be rotated with an electrically powered motor (not shown) as a non-limiting example. In this manner, the end face 52 may be thermally formed in a shape that is more uniform and planar or substantially planar. In this manner, the laser energy from the laser beam 34" is absorbed into the portion of interface 38 of the GRIN rod 36 in the path of the laser beam 34".

Figure 2C:
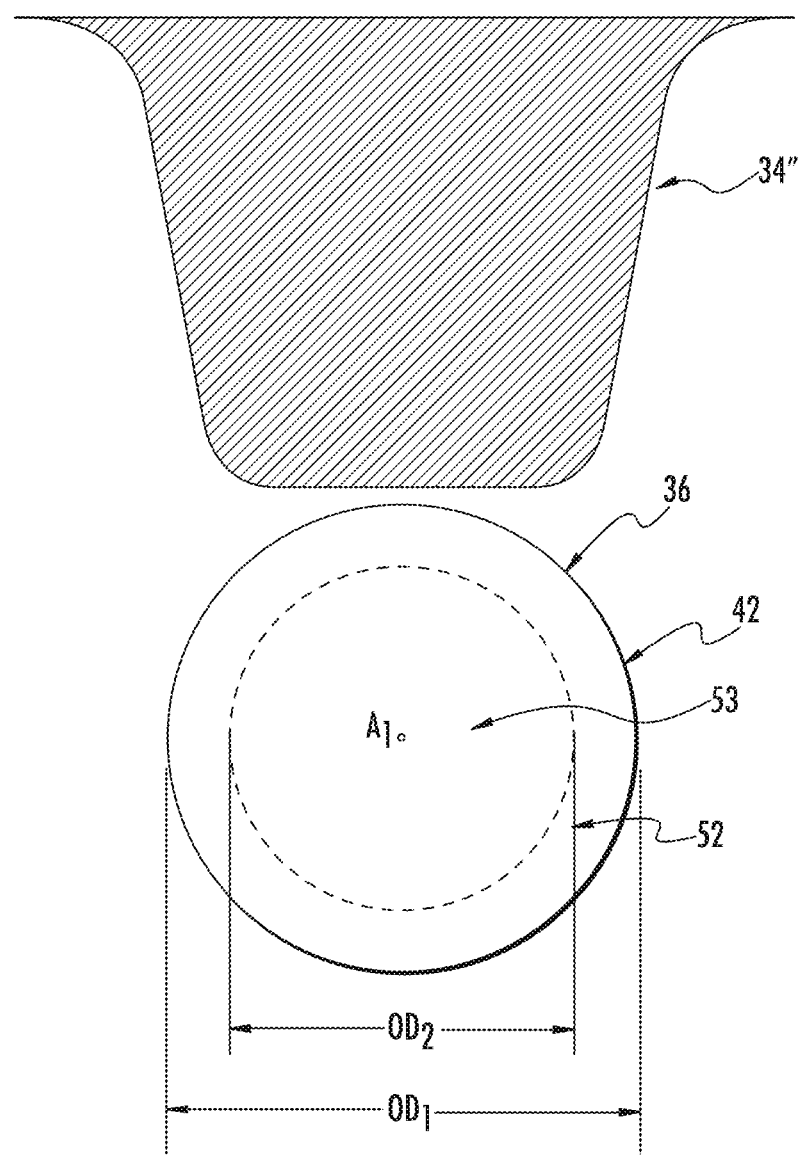
FIG. 2C is a close up, end view of the GRIN rod being rotated about the pulse width controlled laser beam emitted by the laser in the laser processing apparatus of FIG. 2A to fabricate the GRIN lens in FIG. 2A.

With continuing reference to FIG. 2A, the portion of the interface 38 of the GRIN rod 36 in the path of the laser beam 34" absorbs laser energy from the laser beam 34", which causes the GRIN rod 36 to melt and/or ablate at the interface 38. The surface area around the circumference of the GRIN rod 36 at the interface 38 is melted and/or ablated as the GRIN rod 36 is rotated in the path of the laser beam 34". Eventually, the melting and/or ablation of the GRIN rod 36 at the interface 38 will cause the end portion 42 of the GRIN rod 36 to be cut and severed from the main portion 44 of the GRIN rod 36. The severed end portion 42 of the GRIN rod 36 forms the GRIN lens 40. The planar or substantially planar end face 52 is also formed in the GRIN lens 40 in the same process as the cutting and severing of the GRIN rod 36 at the interface 38 by exposing the interface 38 to the line laser beam 34", as illustrated in FIG. 2C. As discussed above, controlling the pulse width duration of the laser beam 34 reduces or prevents heat accumulation in the GRIN rod 36 during laser cutting, thus fabricating the end face 52 of the GRIN lens 40 as a planar or substantially planar surface.

The end face 52 may be fabricated to have a less than two (2) micrometers (μm) flatness over the active region of the GRIN lens 40, and at an angle less than 0.5 degrees. The GRIN rod 36 may be provided having an outer diameter $OD_1$ of approximately 400 micrometers (μm) to fabricate the GRIN lens 40 having an approximate 400 μm outer diameter, with an active region 53 being less than 400 μm in outer diameter, as illustrated in FIG. 2C. FIG. 2C also illustrates a cross-section of the laser beam 34" in the Y-direction, as shown in FIG. 3C described above. The outer diameter $OD_2$ of active region 53 of the GRIN rod 36 that can focus light may be less than the outer diameter $OD_1$ of the GRIN rod 36, for example 340 μm. The GRIN lens 40 can be fabricated to any length desired, for example 1.310 millimeters (mm), as a non-limiting example. The length of the GRIN lens 40 is controlled by the length of the end portion 42 of the GRIN rod 36 disposed beyond the interface 38 of the GRIN rod 36 with the path of the laser beam 34". The GRIN lens 40 can be fabricated at any diameter desired according to the diameter of the GRIN rod 36.

Figure 4A:
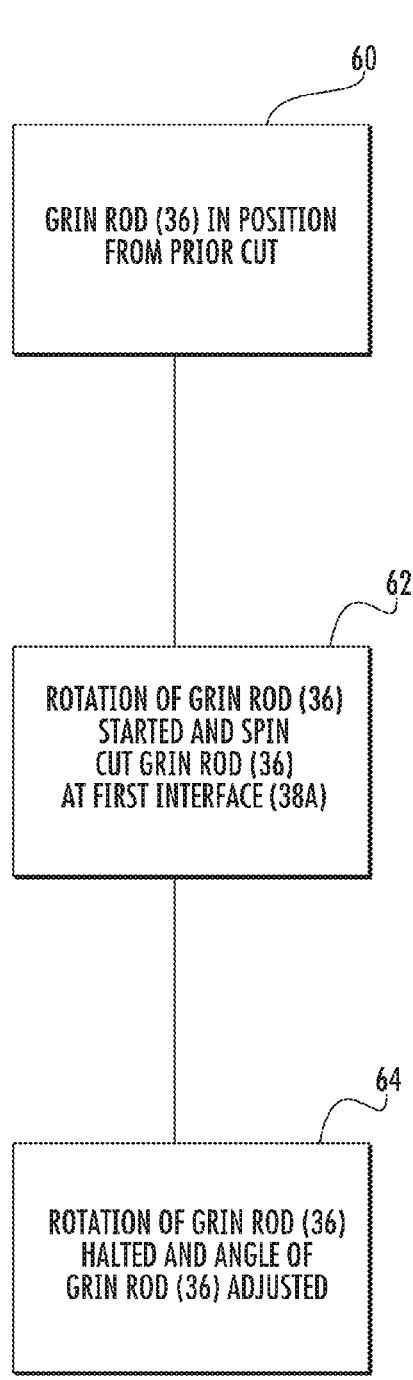
Figure 5A:
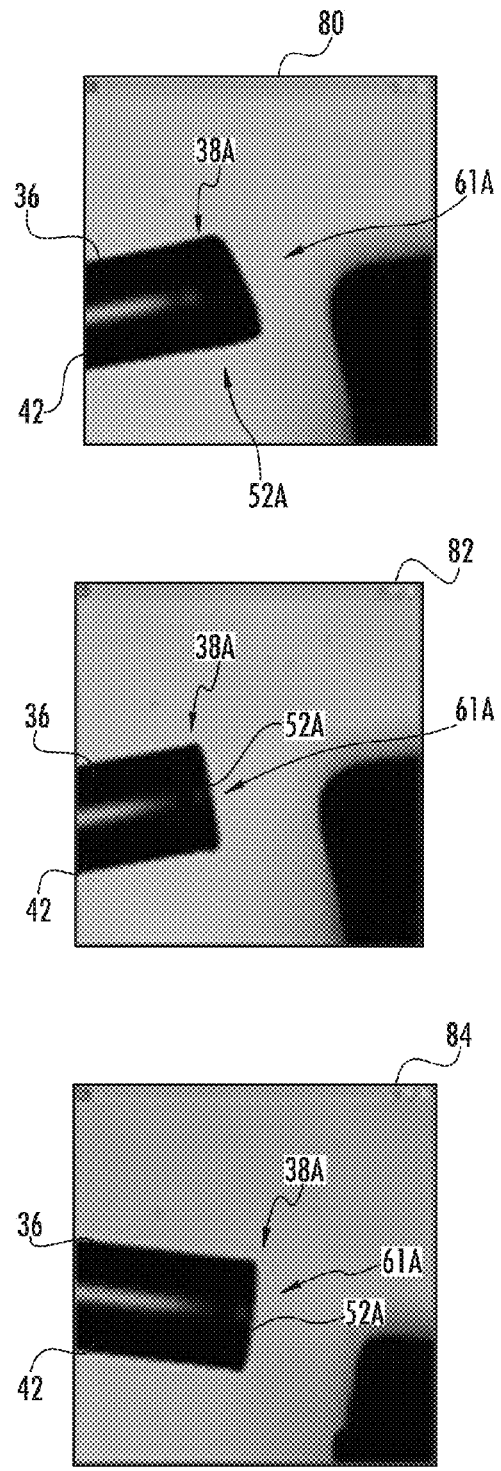

An exemplary process of fabricating the GRIN lens 40 from the GRIN rod 36 employing the laser processing apparatus 30 in FIG. 2A will now be described. In this regard, FIGS. 4A and 4B are flowchart diagrams of an exemplary process of fabrication of the GRIN lens 40 from the GRIN rod 36. FIGS. 5A and 5B are exemplary partial diagrams of the GRIN rod 36 and fabricated GRIN lens 40 as the GRIN lens 40 is fabricated according to each exemplary step in the exemplary GRIN lens fabrication process in FIGS. 4A and 4B. Thus, FIGS. 4A-5B will be described together.

In this regard, as part of a GRIN lens fabrication process, the GRIN rod 36 is positioned in the laser processing apparatus 30 from a prior laser cut into the proper position with regard to the path of the laser beam 34" in FIG. 2A (block 60 in FIG. 4A). This is illustrated in block 80 in FIG. 5A. In this regard, a first interface 38A of the GRIN rod 36 is positioned in the path of the laser beam 34" at an angle incident to the laser beam 34". The cutting of the GRIN rod 36 at the first interface 38A will provide a first end face 52A on a first end 61A of the fabricated GRIN lens 40. Next, the GRIN rod 36 is rotated as the laser beam 34 is emitted by the laser 32 under a first pulse width duration control to direct the laser beam 34" to spin cut GRIN rod 36 at the first interface 38A (block 62 in FIG. 4A). This process forms the first end face 52A at the first interface 38A on a first side of the GRIN rod 36, as illustrated in block 82 in FIG. 5A. As discussed above, controlling the pulse width duration of the laser beam 34 provides a planar or substantially planar first end face 52A.

With continuing reference to FIG. 4A, after the first end face 52A is formed in the GRIN rod 36, the rotation of the GRIN rod 36 is halted (block 64 in FIG. 4A). The angle of the GRIN rod 36 incident to the path of the laser beam 34" is then adjusted to prepare to form a second end face 52B in the GRIN rod 36 (block 64 in FIG. 4A). This is shown in block 84 in FIG. 5A. Then, the GRIN rod 36 is repositioned by being pushed forward with regard to the path of the laser beam 34" so that a second interface 38B is positioned in the path of the laser beam 34" (block 66 in FIG. 4B) to prepare a second end face 58B on a second end 61B of the GRIN rod 36 to fabricate the GRIN lens 40. Alternatively, the GRIN rod 36 can be repositioned by reversing the positioning GRIN rod with regard to the path of the laser beam 34" so that a second interface 38B is positioned in the path of the laser beam 34" to prepare a second end face 58B on a second end 61B of the GRIN rod 36 to fabricate the GRIN lens 40 (block 66 in FIG. 4B). With either scenario, the resulting repositioned GRIN rod 36 is illustrated in block 86 in FIG. 5B. The GRIN rod 36 is then spin cut at the second interface 38B to form the second end face 52B at the second end 61B of the GRIN rod 36 (block 68 in FIG. 4B) as the laser 32 is controlled to emit the laser 34 under a second pulse width duration control. This is shown in block 88 of FIG. 5B. The second pulse width duration of the laser beam 34 may be the same or different than the first pulse width duration of the laser beam 34.

The process of cutting the GRIN rod 36 at the second interface 38B severs the end portion 42 of the GRIN rod 36 from the main portion 44 of the GRIN rod 36 to fabricate the GRIN lens 40, as previously described. The remaining main portion 44 of the GRIN rod 36 becomes the end portion 42 of the next GRIN lens to be fabricated from the GRIN rod 36 back in block 60 in FIG. 4A. The GRIN rod 36 can then be angle adjusted and repositioned for fabricating a next GRIN lens (block 70 in FIG. 4B), as illustrated in block 90 in FIG. 5B. The process can repeat by returning back to block 60 in FIG. 4A. Also, if desired, the first end face 52A and second end face 52B can be further polished.

Figure 6:
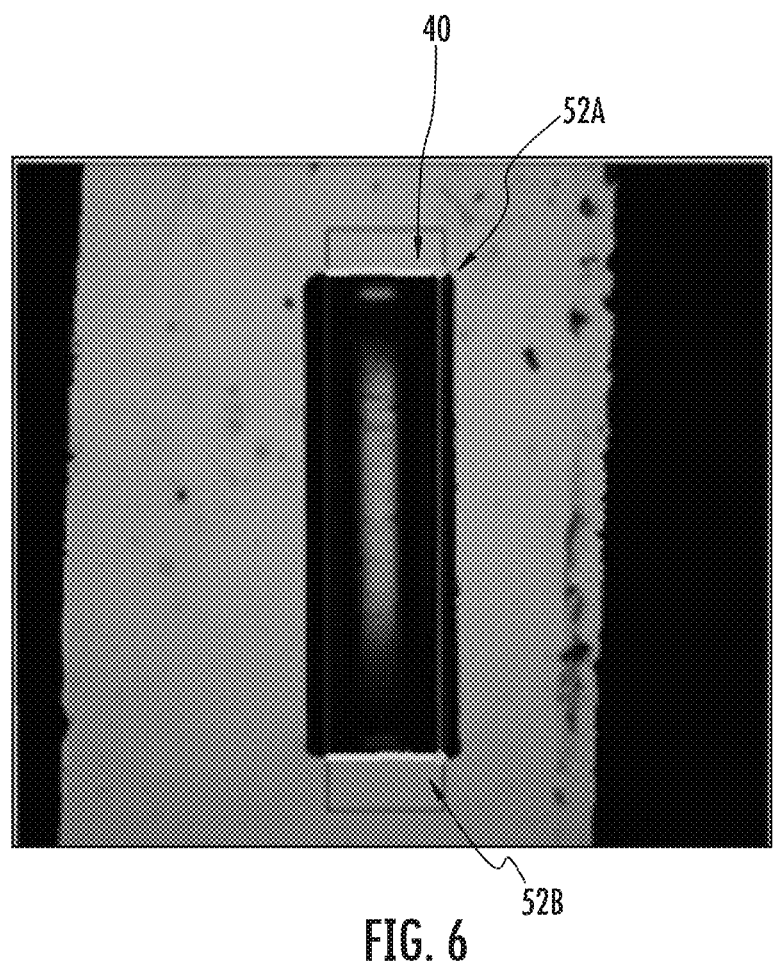
FIG. 6 is a diagram of a completed GRIN lens fabricated by laser processing a GRIN rod with a laser under laser pulse width duration control.

FIG. 6 is a diagram of a completed GRIN lens 40 fabricated by laser processing the GRIN rod 36 in the laser processing apparatus 30 in FIG. 2A and according to the process in FIGS. 4A and 4B. The average length of the GRIN lens 40 in FIG. 6 is 1.3062 mm in this example. The flatness of the GRIN lens 40 at the first end face 52A and the second end face 52A are both within approximately two (2) μm, as a non-limiting example.

Figure 7A:
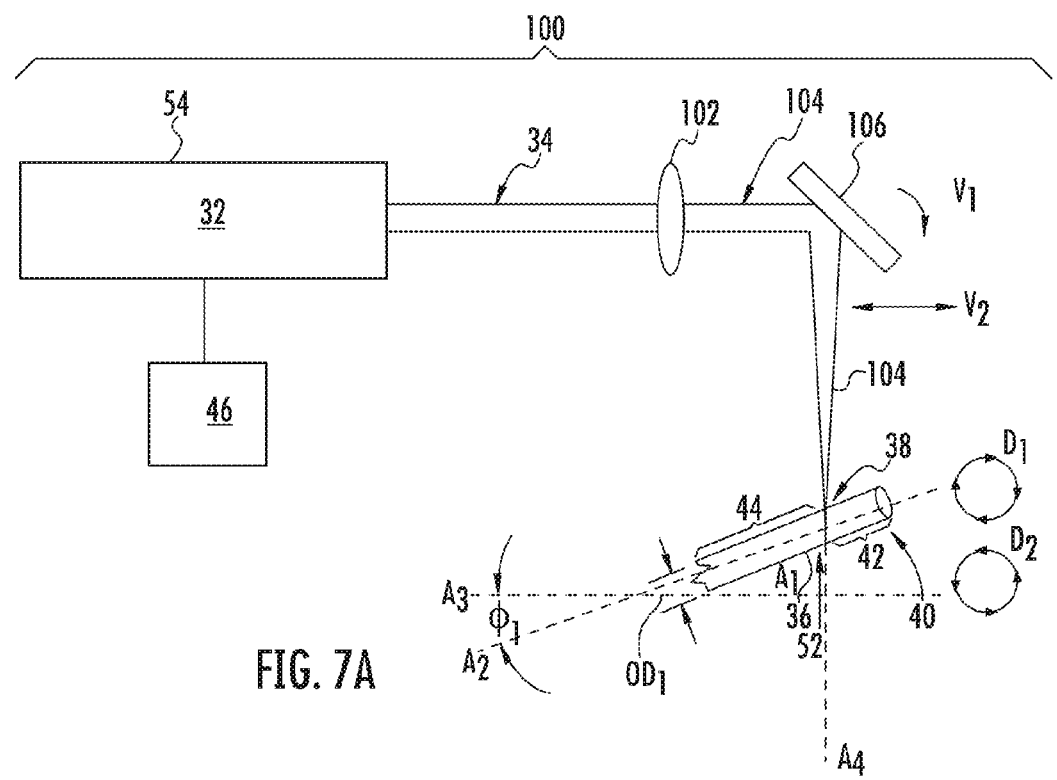
FIG. 7A is a side view of another exemplary laser processing apparatus employing a galvanometer including a laser configured to emit a laser beam under laser pulse width duration control to fabricate a GRIN lens from a GRIN rod.

Other laser processing apparatuses for controlling a laser to direct laser energy to the GRIN rod 36 under pulse width duration control can be provided. For example, the laser processing apparatus can be provided as a galvanometer, where the laser beam is traversed relative to the GRIN rod 36 to fabricate the GRIN lens 40. Galvanometers may be used in applications where rapidly moving and/or positioning of a laser spot is needed or required. In this regard, FIG. 7A is a side view of an exemplary laser processing apparatus 100 employing a galvanometer. The laser processing apparatus 100 shares some common components with the laser processing apparatus 30 of FIG. 2A. These elements are shown with common element numbers between FIGS. 2A and 7A and will not be re-described.

With reference to FIG. 7A, the laser 32 is provided in the fixture 54 and is controlled by a controller 46 to emit the laser beam 34 under pulse width duration control, as previously discussed. The laser 32 may be controlled to emit the laser beam 34 under pulse width duration control, as illustrated in FIG. 2B and previously described above. As discussed above, controlling the pulse width duration of the laser beam 34 reduces or prevents heat accumulation in the GRIN rod 36 during laser cutting, thus fabricating the end face 52 of the GRIN lens 40 as a planar or substantially planar surface. The laser 32 directs the laser beam 34 to at least one focusing lens 102 in the path of the laser beam 34. The focusing lens 102 focuses the received laser beam 34 into a smaller, focused laser spot beam 104 to concentrate the laser energy of the laser beam 34 into a spot size. The spot size of the laser spot beam 104 is controlled by the focusing lens 102. As non-limiting examples, the outer diameter of the laser spot beam 104 may be controlled to be between 40 μm to 200 μm. The focusing lens 102 directs the laser spot beam 104 to at least one steering mirror 106. The mirror 106 may be made of a highly reflective material for the laser spot beam 104 having the desired wavelength range, such as an aluminum material or a silicon carbide material, as non-limiting examples.

Figure 7B:
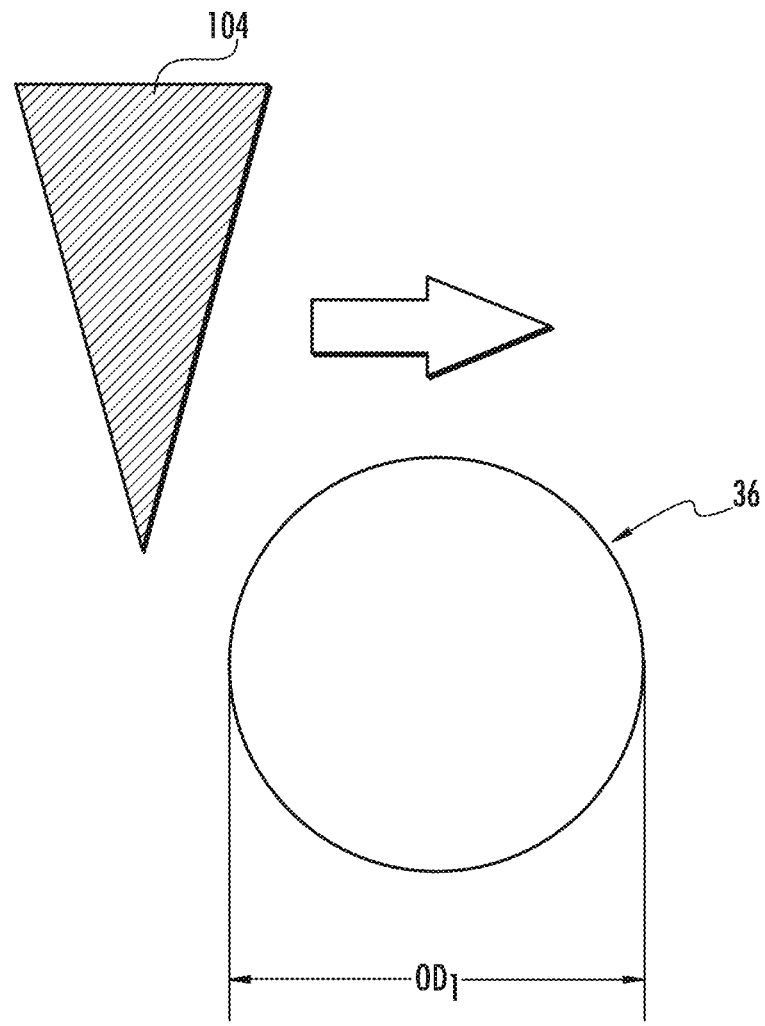
FIG. 7B is a close up, end view of the GRIN rod positioned stationary to a traversed, pulse width controlled laser beam emitted by the laser in the laser processing apparatus of FIG. 7A to fabricate the GRIN lens in FIG. 7A.

With continuing reference to FIG. 7A, the steering mirror(s) 106 translates back and forth along a vector $V_1$, thereby causing the laser beam 104 to translate back and forth along a vector $V_2$, as illustrated in FIG. 7A, to direct and traverse the laser spot beam 104 incident to the GRIN rod 36 to fabricate the GRIN lens 40, as illustrated in FIG. 7B. The GRIN rod 36 may be rotated as the laser spot beam 104 is traversed across the GRIN rod 36 to fabricate the GRIN lens 40. The GRIN rod 36 may be rotated at faster speeds than in the laser processing apparatus 30 in FIG. 2A—for example 80 to 150 rotations per second. The vectors $V_1$, $V_2$ may be the same so there is no angular movement of the steering mirror 106. The duration of interaction between the laser spot beam 104 and the GRIN rod 36 is determined by the speed by which the laser spot beam 104 is traversed across the GRIN rod 36. For example, the laser spot beam 104 may be traversed or swept across the GRIN rod 36 in speed ranges between zero (0) and twenty (20) meters per second (m/s).

The interaction time between the laser spot beam 104 and the GRIN rod 36 may be estimated (not taking into consideration the width of the laser spot beam 104) as the outer diameter $OD_1$ of the GRIN rod 36 divided by the laser spot beam 104 traverse speed. For example, if the outer diameter $OD_1$ of the GRIN rod 36 is 400 μm, and the laser spot beam 104 is traversed at 1,000,000 μm/s, the interaction time would be 400 μs.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, the laser energy to cut a GRIN rod may be both temporally and spatially controlled. The laser beam delivery system may include a Gaussian line energy distribution system or a laser spot beam delivery system as non-limiting examples. The angle of the GRIN rod relative to the laser beam path may be adjusted to control the planarity of the end faces cut into the GRIN rod to fabricate the GRIN lens.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A method of fabricating a gradient-index (GRIN) lens from a GRIN rod, comprising:
    positioning an interface of a GRIN rod in a laser beam path of a laser configured to emit a laser beam in the laser beam path;
    providing a rotational relationship between the GRIN rod and the laser beam path;
    controlling the laser to direct a laser beam in pulse width durations in the laser beam path incident to the interface of the GRIN rod, to spin cut a planar or substantially planar optical surface end face in the GRIN rod at the interface.

2. The method of claim 1, wherein the pulse width durations are approximately eight percent (8%) to twelve percent (12%) of laser beam emission periods of the laser.

3. The method of claim 1, wherein the pulse width durations are 350 microseconds (μs) to 450 μs.

4. The method of claim 1, wherein controlling the laser to direct the laser beam further comprises controlling the laser to not direct the laser beam during rest durations in laser beam emission periods.

5. The method of claim 4, wherein the rest durations are approximately 4400 μs to 4800 μs.

6. The method of claim 1, wherein the GRIN rod has an outer diameter of approximately 400 micrometers (μm).

7. The method of claim 1, further comprising controlling energy distribution of the laser beam incident to the interface of the GRIN rod to spin cut the planar or substantially planar optical surface end face in the GRIN rod at the interface.

8. The method of claim 1, further comprising rotating the GRIN rod in the laser beam path during the controlling of the laser to direct the laser beam incident to the interface of the GRIN rod.

9. The method of claim 1, further comprising polishing the planar or substantially planar optical surface end face in the GRIN rod during the rotating of the GRIN rod.

10. The method of claim 1, further comprising traversing the laser beam of the laser about the GRIN rod during the controlling of the laser to direct the laser beam incident to the interface of the GRIN rod.

11. The method of claim 1, further comprising positioning a longitudinal axis of the GRIN rod at an angle to the laser beam path before the controlling of the laser.

12. The method of claim 1, further comprising:
rotating the GRIN rod in the laser beam path during the controlling of the laser to direct the laser beam incident to the interface of the GRIN rod; and
stopping the rotation of the GRIN rod after the controlling of the laser to direct the laser beam incident to the interface of the GRIN rod.

13. The method of claim 1, further comprising:
repositioning the GRIN rod forward to dispose a second interface of the GRIN rod disposed a distance from the interface of the GRIN rod in the laser beam path; and
controlling the laser to direct the laser beam in second pulse width durations in the laser beam path incident to the second interface of the GRIN rod to spin cut a second planar or substantially planar optical surface end face in the GRIN rod at the second interface to fabricate a GRIN lens.

14. The method of claim 13, wherein the pulse width durations and the second pulse width durations are same pulse width durations.

15. The method of claim 13, further comprising rotating the GRIN rod in the laser beam path during the controlling of the laser to direct the laser beam incident to the second interface of the GRIN rod.

16. The method of claim 15, further comprising stopping the rotating of the GRIN rod before the rotating of the GRIN rod in the laser beam path during the controlling of the laser to direct the laser beam incident to the second interface of the GRIN rod.

17. The method of claim 13, further comprising positioning a longitudinal axis of the GRIN rod at a first angle to the laser beam path.

18. The method of claim 17, comprising positioning the longitudinal axis of the GRIN rod at a second angle to the laser beam path during the repositioning of the GRIN rod.

19. The method of claim 18, further comprising positioning the longitudinal axis of the GRIN rod back to the first angle to the laser beam path during the repositioning of the GRIN rod.

20. The method of claim 13, further comprising repeating the positioning of a next interface of a GRIN rod, providing a rotational relationship between the GRIN rod and the laser beam path, and controlling the laser to direct the laser beam in the pulse width duration of the laser beam emission period in the laser beam path incident to the next interface of the GRIN rod, to spin cut a planar or substantially planar optical surface end face in a second GRIN rod at the next interface.

21. The method of claim 1, wherein controlling the laser further comprises controlling the interaction time between the laser beam and the GRIN rod to spin cut the planar or substantially planar optical surface end face in the GRIN rod at the interface.

22. An apparatus for fabrication a gradient-index (GRIN) lens from a GRIN rod, comprising:
a laser configured to emit a laser beam in pulse width durations in a laser beam path;
a fixture configured to support a GRIN rod in the laser beam path of the laser, wherein the fixture is further configured to support the GRIN rod in rotational relationship with laser beam path; and
a controller configured to direct the laser to emit the laser beam in pulse width durations in the laser beam path incident to an interface of the GRIN rod, to spin cut a planar or substantially planar optical surface end face in the GRIN rod at the interface.

23. The apparatus of claim 22, wherein the laser is comprised from the group consisting of a carbon dioxide laser and a carbon monoxide laser.

24. The apparatus of claim 22, wherein the controller is configured to control energy distribution of the laser beam incident to the interface of the GRIN rod to spin cut the planar or substantially planar optical surface end face in the GRIN rod at the interface.

25. The apparatus of claim 22, wherein the controller is further configured to cause the fixture to rotate the GRIN rod in the laser beam path during the control of the laser to direct the laser beam incident to the interface of the GRIN rod.

26. The apparatus of claim 22, wherein the laser is included in a galvanometer configured to cause the laser beam of the laser to traverse the GRIN rod during the control of the laser to direct the laser beam incident to the interface of the GRIN rod.

27. The apparatus of claim 22, wherein the fixture is configured to position the longitudinal axis of the GRIN rod at an angle to the laser beam path before the controlling of the laser.

28. The apparatus of claim 22, wherein the controller is further configured to:
cause the fixture to reposition the GRIN rod forward to dispose a second interface of the GRIN rod disposed a distance from the interface of the GRIN rod in the laser beam path; and
control the laser to direct the laser beam in second pulse width durations in the laser beam path incident to the second interface of the GRIN rod to spin cut a second planar or substantially planar optical surface end face in the GRIN rod at the second interface to fabricate a GRIN lens.

29. The apparatus of claim 28, wherein the controller is configured to control the pulse width durations and the second pulse width durations to be of the same pulse width durations.

30. The apparatus of claim 28, wherein the controller is further configured to:
rotate the GRIN rod in the laser beam path during the controlling of the laser to direct the laser beam incident to the interface of the GRIN rod;
stop the rotation of the GRIN rod after the controlling of the laser to direct the laser beam incident to the interface of the GRIN rod; and
rotate the GRIN rod in the laser beam path during the controlling of the laser to direct the laser beam incident to the second interface of the GRIN rod.

31. The apparatus of claim 30, wherein the controller is further configured to stop the rotating of the GRIN rod before the rotating of the GRIN rod in the laser beam path during the controlling of the laser to direct the laser beam incident to the second interface of the GRIN rod.

32. The apparatus of claim 28, wherein the controller is configured to cause the fixture to position a longitudinal axis of the GRIN rod at a first angle to the laser beam path.

33. The apparatus of claim 32, wherein the controller is configured to cause the fixture to position the longitudinal axis of the GRIN rod at a second angle to the laser beam path during a repositioning of the GRIN rod.

34. The apparatus of claim 33, wherein the controller is further configured to cause the fixture to position the longitudinal axis of the GRIN rod back to the first angle to the laser beam path during the repositioning of the GRIN rod.

35. The apparatus of claim 22, wherein the controller is further configured to control the interaction time between the laser beam and the GRIN rod to spin cut the planar or substantially planar optical surface end face in the GRIN rod at the interface.

* * * * *